Patented Sept. 14, 1937

2,093,040

UNITED STATES PATENT OFFICE 2,093,040

HARDENED GLASS AND METHOD OF MAKING THE SAME

Fritz Eckert, Berlin-Charlottenburg, Germany, assignor to The American Securit Company, Wilmington, Del., a corporation of Delaware No Drawing. Application July 26, 1935, Serial No. 33,411. In Germany February 13, 1932

9 Claims. (Cl. 49—89)

The invention relates to the toughening or hardening of glass or glass objects by heating the glass object almost to the softening point (deformation point) and then exposing it to a sudden adequate fall in temperature.

According to the oldest toughening or hardening process of De la Bastie, glass objects heated almost to the softening point, are chilled directly in an oil bath having a temperature of 150–250° C. According to the later Siemens processes, the chilling is performed on flat glass by contact with cold metal plates or the like. When the cooling takes place rapidly, stresses are caused and it is on the presence of these stresses that the toughening or hardening effect obtained by these processes is based. In order to produce well toughened or hardened glass, a considerable and rapid fall in temperature must characterize the cooling operation. On the other hand, this rapid fall in temperature caused a high percentage of breakage in the course of manufacture of toughened glass. In an attempt to avoid this, the fall in temperature was regulated by either somewhat adjusting the length of the temperature range, or by regulating the chilling speed by using less abrupt cooling means, for example, by using compressed air as the cooling means instead of cold metal plates or the oil bath, the cooling in the less abrupt method being however still rapid as compared with the very slow cooling employed in the manufacture of unhardened glass.

When the glass is greatly toughened or hardened, it is common knowledge that apart from the desired increase in strength, the particular glass, when broken, crumbles to small fragments or even to dust, free or substantially free from dangerous splinters. It is also known that such a great toughening or hardening can only be attained if, in cooling, the fall in temperature is exploited to the utmost possibility, and there is ample uniformity in the distribution of the cooling means.

As is known, in the cooling of glass two types of stresses arise, viz., permanent and temporary ones.

The development of the permanent stresses, which cause the anisotropic condition of the glass, may be explained as follows:—

By rapid cooling the surface of the glass is suddenly solidified, the central parts being still hot, and consequently much dilated. When these last become solidified and cooled down they must have retained points of adherence to the surface, and consequently occupy a larger volume than that which agrees with the temperature to which they are reduced; the central molecules are, therefore, more distended than usual, and exert a powerful contracting force on the surrounding parts. At the instant when a part of the envelope or outer portion is broken, the molecules which had been retained by it briskly contract, draw in with them all the others, and thus determine a multitude of points of rupture.

The temporary stresses are mainly caused by temperature differences which are present in the glass, while it is in a temperature range of the elastic-solid state of glass and is in itself isotropic, i. e., in a lower temperature range than that in which the glass is conditioned for the subsequent development of the permanent stresses therein.

It should be perhaps mentioned that, though the permanent stresses are originated by temperature differences arising in the glass so long as the glass is partly in the plastic state, these permanent stresses are only set up at a later stage of the cooling, whereas the temporary stresses which are caused in a lower range of temperature are set up earlier than the permanent stresses.

The permanent stresses appear mainly in the form of compression of the surface layers and tension of the inner layer of the plate, whereas the temporary stresses on the contrary appear mainly in the form of tensile stresses at individual parts of the surface layers.

The invention is based on recognition of the fact that in the course of the hitherto known toughening methods both the temporary and the permanent stresses were developed in the glass but that the subsequent final hardened condition of the glass depends only upon the extent of the permanent stresses, whereas the temporary stresses are not only useless as regards the degree of toughening, but in practice generally lead to breakage.

The recognition of this fact is utilized for an improved method of glass hardening, wherein, according to the invention, the hardening procedure is so arranged as to obtain as large an amount as possible of permanent stresses in the glass, while at the same time avoiding the development of transient or temporary stresses as far as possible. Thus, in accordance with the invention, the possibility is provided of obviating the disadvantages of the previous hardening processes while at the same time attaining so great a hardening that splinter-free crumbling of the hardened glass can be obtained with certainty when the glass breaks. The invention further enables the hardening process to be applied successfully also to lesser plate thicknesses and to types of glass which were previously considered unsuitable therefor.

According to the present invention, the glass, after adequate heating, is cooled as quickly as possible down to a temperature which lies at or near or somewhat below the lower annealing temperature of the glass to be hardened, i. e., that temperature at and below which the temporary stresses are mainly developed. A further chilling, uselessly increasing these dangerous temporary stresses, is thus avoided. The continued cooling of the glass until it assumes the temperature of the surrounding atmosphere then takes place gradually in the manner customary for the production of unhardened glass. To effect a more rapid "interception" of the chilling operation at the required moment, a brief heat impact may also be made to play on the surface of the plate, say by drawing the glass through a veil of flame.

The chilling procedure is therefore, according to the invention, confined to that temperature range which is mainly responsible for the conditioning of the glass for the subsequent development of the permanent stresses, whereas the lower temperature range, within which temporary stresses arise during chilling, is no longer used for chilling, a gradual cooling being applied instead within this lower temperature range.

It has been found that this method results in well or better hardened products while at the same time the percentage of breakages occurring during manufacture is materially decreased, if not entirely avoided.

Though I have tried above to give as full a theory of what happens during the chilling and cooling of glass, I do not wish to be bound by these explanations as my improved method of toughening or hardening glass is practicable without making use of these theoretic explanations.

Thus for chilling according to the invention, a temperature range lying between the softening temperature of the particular glass and a temperature at or near or close below its lower annealing temperature is used. The extent of this temperature range depends on the particular nature of the glass and to a certain degree also on the circumstances under which the glass object in question has been manufactured, i. e., so to speak on the history of the glass object. The smaller the available temperature range, the quicker must the chilling be, i. e., the more effective must the chilling means be. In contradistinction to this, it has been customary hitherto to do the chilling over a greater temperature range and correspondingly slower.

The thinner the glass is, the greater is the requisite range of the fall in temperature, or the more effective must the means be in order also to obtain complete hardening to the point of splinter-free crumbling in the case of thin glass plates. If, from what is taught by this invention, the fall in temperature in the case of thin plates is arranged to lie in the range within which the glass is conditioned for the subsequent development of the permanent stresses therein, then this degree of hardening can also be obtained with thin plates, e. g., plates of less than 5 mm. thickness.

For the purpose of indicating the speeds necessary for hardening, it may be mentioned that, according to the types of glass to be handled, approximately the following chilling periods should be used, in the course of which the glass must be chilled from the lower softening temperature to the lower annealing temperature: for glass 5–6 mm. thick, chilling periods of 5–15 seconds, and for glass 2–3 mm. thick, of 3–10 seconds will serve, the initial chilling being correspondingly intensified, whereas hitherto chilling has extended over substantially longer periods.

The invention is preferably employed in conjunction with those known hardening processes where the chief cooling means is air, preferably compressed air. For intensification purposes, water, oil or steam can be added to the current of air. Fluids or steam are added in a finely atomized form, for preference. Highly condensed gases can be used as carriers, e. g., highly condensed carbonic acid.

It is advisable to use cooling means, whose cooling effect is fully adjustable; in this way the cooling procedure can be supervised with sufficient accuracy to enable the total favorable temperature range to be employed without it being overstepped. The regulation of the cooling effect can for instance be performed by regulation of current velocity and/or of the pressure of the air or gas stream and/or by regulation of the quantity and size of the droplets of the additional means such as water and oil.

According to the present invention the hardening process is so performed that the production of temporary tensile stresses is excluded as far as possible and the prescribed conditions for the production of permanent tensions are increased as far as possible. For this purpose the range of the sudden fall in temperature is put as high as possible, the upper limit of this range being taken at or near the softening point and the lower limit by a point at or near the lower annealing temperature of the particular glass. Within the available range the intensity of the chilling is regulated, for instance by the choice of suitable properties for the cooling means. If the available temperature range is large, milder cooling means can be taken; if the temperature range of a certain type of glass is small, a sharper cooling means must be used; furthermore the thinner the wall of the glass object to be hardened, the sharper must the cooling means be.

When carrying the new process into practical effect, it is convenient to make use of measures and devices customary in older hardening processes for the purpose of chilling and cooling. The temperatures and chilling speeds to be used in hardening according to the present invention depend in each individual case on the nature of the glass and other circumstances presenting no difficulty to the person skilled in the art. Below, several practical examples are given, without however, restricting the invention to the data, cooling means or constructional devices mentioned in these examples.

*Example I*

A ground and polished glass plate, 25–35 cm. high, 100–125 cm. wide and 0.6 cm. thick, of a type of glass whose softening temperature lies at approximately 650 deg. C., is heated within 5–6 minutes in an oven temperature of 720 deg. C. to approximately 620 deg. C. and is then quickly chilled within 10 to 15 seconds to a temperature of approximately 400 deg. C. on the outer surfaces of the plate. Then slow cooling takes place to a temperature of 100 deg. C. within 20 minutes, or to 30 deg. C. within 100 minutes. The speedy initial cooling is effected by air at a pressure of 3.5 atmospheres, this air meeting the plate perpendicularly and emerging from 0,8 mm. blast-pipes which have a distance of 50 mm. from one another, and the distance of the blast-pipes from the plate surfaces being about 75 mm.

*Example II*

A glass plate, 60 cm. high, 90 cm. wide and 0,7 cm. thick, which has been manufactured according to one of the known drawing processes and has been provided with round ground corners and a fine rim, but left raw in other respects, whose softening temperature lies at approximately 580 deg. C. and its lower annealing temperature at approximately 430 deg. C., is heated in a vertical position from the temperature in the room to a temperature of 570 deg. within 5–6 minutes in an oven, whose temperature is about approximately 650 deg. C. The plate which continues to be held in a vertical position is then exposed to the action of ventilator air, which is blown through funnels on both sides of the plate. The chilling is performed within 10 to 15 seconds to say 450 deg. C., or in 15 seconds to say 420 deg. C., this temperature data referring to the surfaces of the plates. The distance between the plate surfaces and funnel openings is about 40 mm. and the ventilator air is fed under a pressure of a 60 mm. column of water.

Then follows a slow cooling to approximately 100 deg. C. within 2 minutes by throttling the air feed by 20%, the distance between the plate surfaces and funnel openings being increased to 550 mm.

The plate is then taken out of the ventilator aggregate and is slowly cooled within an hour by heat equalization down to the temperature of the room.

*Example III*

A thin polished glass plate, 60 cm. high, 120 cm. wide and 0,35 cm. thick, whose softening temperature lies at approximately 640 deg. C. and its bottom annealing temperature at approximately 460 deg. C., is heated in a vertical position within 3 minutes to a temperature of approximately 590 deg. and is then chilled within 3 seconds to a temperature of approximately 430 deg. C. at the surfaces of the plate. A blast-pipe aggregate is used as the cooling device in the manner mentioned in Example I, but the individual blast-pipes are constructed as swivelling pipes and so arranged that one blast-pipe each operates on 100 cm$^2$ of the glass plate. Compressed air of 4 atm. and atomized water sucked in by the compressed air are used as the cooling means. From the 3rd to the 10th second the water is then cut off and only compressed air of 3,5 atm. used.

Then a continual gradual cooling within 60 minutes to 150 deg. C. takes place inside a cooling oven. The plate is then left and its temperature becomes equal to the general temperature around it within approximately half an hour.

*Example IV*

A square plate, 40 cm. across and 8 mm. thick, of glass having the same heating properties as Example I, is heated in the same way as in that example. The chilling should be performed by having the plate drawn through a current of dry steam, for a matter of 2 seconds, this vapour emerging with a pressure of 5 atmospheres from blast-pipes 1 mm. large, at a distance of 150 mm. from the plate and at a distance from one another of 100 mm. Then the plate goes into a blast-pipe box actuated by compressed air as described in Example I, and it stays there 12 seconds. Then for another 5 seconds it is taken into the oven described in the beginning, so that its surface assumes a number of calories which does not however suffice to penetrate into the interior of the plate to so increase the temperature there as to amount to a substantial overstepping of the lower annealing temperature.

What I claim is:

1. The method of hardening glass to develop permanent stresses therein and to minimize the development of temporary stresses which consists in heating the glass to approximately its softening point, rapidly chilling the glass from approximately its softening point down to a temperature approximately that of its lower annealing temperature and then cooling the glass at a slower rate.

2. The method of hardening glass to develop permanent stresses therein and to minimize the development of temporary stresses which consists in heating the glass to approximately its softening point, rapidly chilling the glass to approximately the temperature at which temporary stresses develop, and then cooling the glass at a slower rate.

3. The method of hardening glass to develop permanent stresses therein and to minimize the development of temporary stresses which consists in heating the glass to approximately its softening point, rapidly chilling the glass to a temperature approximately that of its lower annealing temperature, applying heat briefly to the glass, and then cooling the glass at a slower rate.

4. The method of hardening glass sheets or other glass articles to develop a maximum amount of permanent stresses therein and to minimize the development of temporary stresses which consists in heating the glass to approximately its softening point, chilling the glass rapidly to a lower temperature and to approximately a point where temporary stresses develop and thereafter cooling the glass at a slower rate and at a still lower temperature.

5. The method of hardening glass not exceeding eight millimeters in thickness to produce permanent stresses therein and to minimize the development of temporary stresses which consists in heating the glass to approximately the softening point, rapidly chilling the glass to a temperature approximating the lower annealing point of the glass within a period of time not exceeding fifteen seconds, discontinuing the rapid chilling, and thereafter cooling the glass at a slower rate.

6. The method of hardening glass not exceeding eight millimeters in thickness to produce permanent stresses therein and to minimize the development of temporary stresses which consists in heating the glass to a temperature not exceeding 650° C., rapidly chilling the glass to a surface temperature not less than 400° C. within a period of time not exceeding fifteen seconds, and then cooling the glass at a slower rate.

7. The method of hardening glass sheets or other glass articles to develop a maximum amount of permanent stresses therein and to minimize the development of temporary stresses which consists in heating the glass to approximately its softening point, rapidly chilling the heated glass to approximately its lower annealing temperature, further chilling the glass within a time approximately twice that of the initial chilling, thereafter gradually and slowly cooling the glass over a substantial period of time and then permitting the glass to assume the temperature of the normal surrounding atmosphere.

8. A method of hardening glass having a thickness not exceeding three millimeters to produce permanent stresses therein and to minimize the development of temporary stresses which consists in heating the glass to approximately its softening point, rapidly chilling the glass from its lower softening temperature to its lower annealing temperature within a period of time not exceeding ten seconds and thereafter cooling the glass at a slower rate.

9. The method of hardening glass not exceeding six millimeters in thickness to produce permanent stresses therein and to minimize the development of temporary stresses which consists in heating the glass to approximately its softening point, rapidly chilling the glass from its lower softening temperature to its lower annealing temperature within a period of time not exceeding fifteen seconds, and thereafter cooling the glass at a slower rate.

FRITZ ECKERT.